US008881168B2

(12) United States Patent
Bobroff et al.

(10) Patent No.: US 8,881,168 B2
(45) Date of Patent: *Nov. 4, 2014

(54) SCHEDULING A PARALLEL JOB IN A SYSTEM OF VIRTUAL CONTAINERS

(75) Inventors: Norman Bobroff, Katonah, NY (US); Liana Liyow Fong, Irvington, NY (US); Yanbin Liu, New Haven, CT (US); Seetharami R. Seelam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/609,869

(22) Filed: Sep. 11, 2012

(65) Prior Publication Data

US 2013/0024872 A1 Jan. 24, 2013

Related U.S. Application Data

(63) Continuation of application No. 12/874,558, filed on Sep. 2, 2010.

(51) Int. Cl.
*G06F 9/46* (2006.01)
*G06F 9/455* (2006.01)
*G06F 9/50* (2006.01)

(52) U.S. Cl.
CPC .......... *G06F 9/505* (2013.01); *G06F 2209/504* (2013.01); *G06F 9/5077* (2013.01)
USPC ................................ 718/105; 718/1; 718/104

(58) Field of Classification Search
CPC ............................. G06F 9/5005; G06F 9/5077
USPC .......................................................... 718/105
See application file for complete search history.

(56) References Cited

U.S. PATENT DOCUMENTS 5,898,870 A * 4/1999 Okuda et al. ................... 718/104
6,427,152 B1 7/2002 Mummert et al.
(Continued)

FOREIGN PATENT DOCUMENTS

WO WO 2009059377 5/2009

OTHER PUBLICATIONS

Sodan A., "Adaptive Scheduling for QoS Virtual Machines Under Different Resource Availability: First Experiences", JSSPP 2009, LNCS, vol. 5798, pp. 259-279; (2009).

(Continued)

*Primary Examiner* — Abdullah Al Kawsar
(74) *Attorney, Agent, or Firm* — Ryan, Mason & Lewis, LLP

(57) ABSTRACT

Methods and apparatus are provided for scheduling parallel jobs in a system of virtual containers. At least one parallel job is assigned to a plurality of containers competing for a total capacity of a larger container, wherein the at least one parallel job comprises a plurality of tasks. The assignment method comprises determining a current utilization and a potential free capacity for each of the plurality of competing containers; and assigning the tasks to one of the plurality of containers based on the potential free capacities and at least one predefined scheduling policy. The predefined scheduling policy may comprise, for example, one or more of load balancing, server consolidation, maximizing the current utilizations, minimizing a response time of the parallel job and satisfying quality of service requirements. The load balancing can be achieved, for example, by assigning a task to a container having a highest potential free capacity.

10 Claims, 8 Drawing Sheets

(56) References Cited

U.S. PATENT DOCUMENTS

| | | | |
|---|---|---|---|
| 6,697,373 B1 | 2/2004 | Sandstrom | |
| 7,028,158 B1 | 4/2006 | Beatty et al. | |
| 8,332,854 B2 | 12/2012 | Kinsey | |
| 2002/0188877 A1 | 12/2002 | Buch | |
| 2003/0163512 A1 | 8/2003 | Mikamo | |
| 2005/0120160 A1 | 6/2005 | Plouffe et al. | |
| 2005/0132362 A1 | 6/2005 | Knauerhase et al. | |
| 2005/0175004 A1 | 8/2005 | Russell et al. | |
| 2006/0002360 A1 | 1/2006 | Ji et al. | |
| 2006/0020944 A1 | 1/2006 | King et al. | |
| 2007/0143758 A1 | 6/2007 | Coppinger et al. | |
| 2007/0256077 A1* | 11/2007 | Zhong | 718/104 |
| 2008/0022284 A1 | 1/2008 | Cherkasora et al. | |
| 2008/0028408 A1 | 1/2008 | Day et al. | |
| 2008/0320284 A1 | 12/2008 | Grzywna et al. | |
| 2009/0064162 A1 | 3/2009 | Amin | |
| 2009/0144426 A1 | 6/2009 | Gao et al. | |
| 2009/0158275 A1 | 6/2009 | Wang et al. | |
| 2010/0306382 A1 | 12/2010 | Cardosa et al. | |
| 2011/0314465 A1* | 12/2011 | Smith et al. | 718/1 |

OTHER PUBLICATIONS

Sodan et al., "Adaptive Time/Space Sharing wiht SCOJO", 18th International Symposium on High Performance Computing Systems and Applicaitons, pp. 156-176. May 16-19, 2004.

Liang et al., "Related Task Scheduling Research Based on Virtual Clusters and Partitioning of Task," Scalcom-embeddedcom, Int'l Conf. on Scalable Computing and Commmunications; 8th Int'l Conf. on Embedded Computing; pp. 131-136 (2009).

Wang et al., Capacity and Performance Overhead in Dynamic Resource Allocation to Virtual Containers, in Proc. of the IFIP/IEEE Symposium on Integrated Management, p. 226 (2007).

* cited by examiner

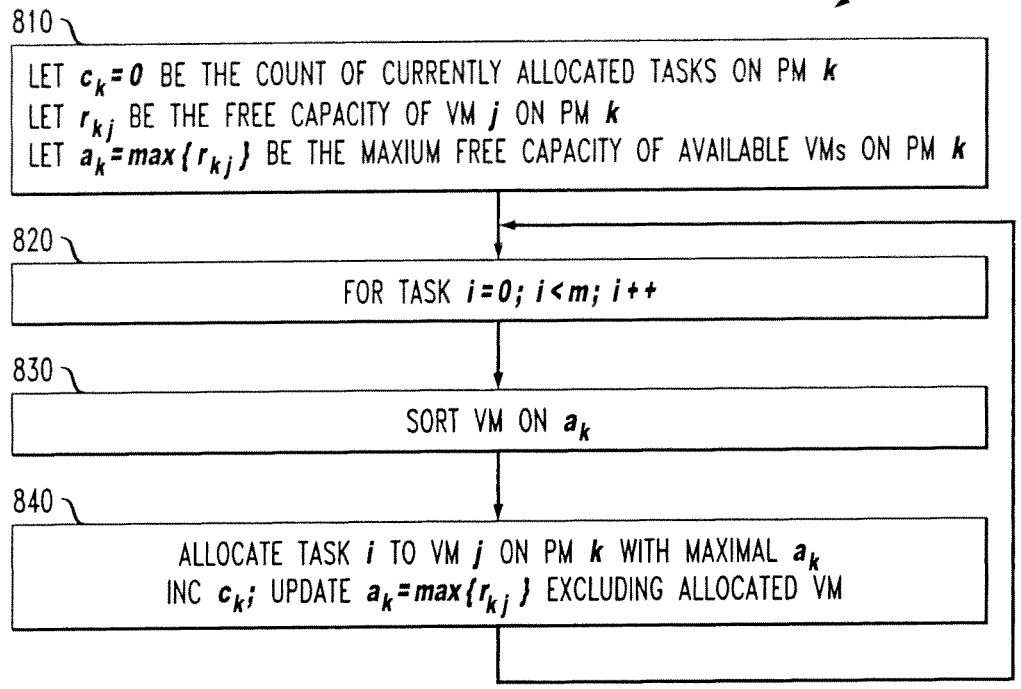
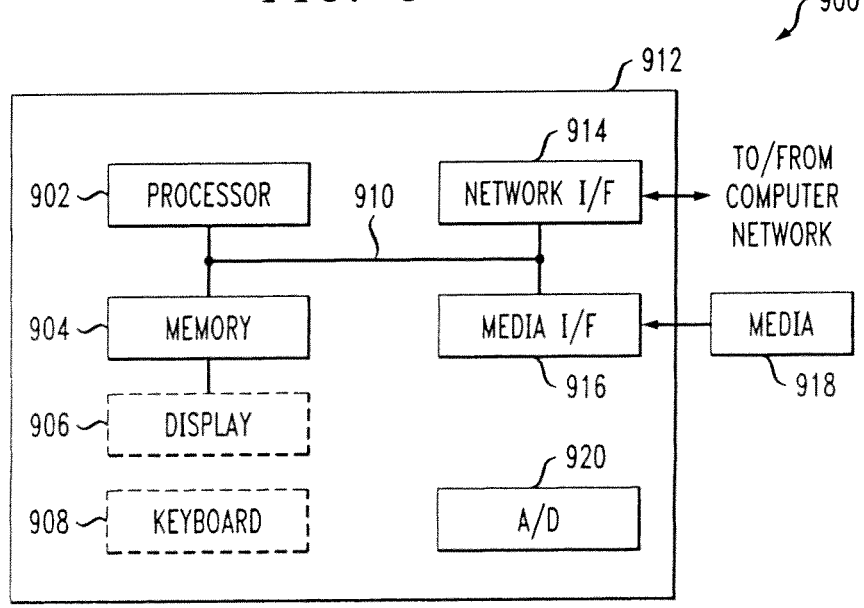

SCHEDULING A PARALLEL JOB IN A SYSTEM OF VIRTUAL CONTAINERS

CROSS-REFERENCE TO RELATED APPLICATIONS

This application is a continuation of U.S. patent application Ser. No. 12/874,558, filed Sep. 2, 2010, incorporated by reference herein.

The present application is related to U.S. patent application Ser. No. 12/751,089, filed Mar. 31, 2010, entitled "Methods and Apparatus for Resource Capacity Evaluation in a System of Virtual Containers," incorporated by reference herein.

FIELD OF THE INVENTION

The present invention relates generally to the electrical, electronic and computer arts, and, more particularly, to the scheduling of parallel jobs in a system of virtual containers.

BACKGROUND OF THE INVENTION

When computer resources are shared, a scheduler assigns processes to one or more available processors or other resources. Typically, the scheduler assigns work, such as batch jobs, by matching job requirements with the capabilities and capacity of the resource(s). Traditionally, jobs have been assigned directly to physical resources, based on current utilization and fixed capacity. More recently, however, the physical resources are exposed through one or more resource containers (often referred to as "virtual machines"), each providing an abstraction of the underlying resources. The shared physical resources can include, for example, processing cores, storage systems, and network communication resources.

In a multi-container environment, the various containers share and compete for fixed physical resources, such as processor cycles, typically under the supervision of a container manager. The container manager typically assigns the physical resources to containers according to a set of rules or policies. The resource competition between containers adds even greater complexity to the scheduling problem. The evaluation of the resource capacity is particularly challenging in a multi-container environment.

Scheduling a job to one or more virtual containers to meet a particular service objective is also a challenge. It is particularly challenging to schedule parallel jobs to a collection of virtual containers. Parallel jobs often require uniform and concurrent execution across multiple virtual containers on physical containers. Resources exposed by virtual containers are elastic and shared with other containers, which makes it a challenge to satisfy the requirements of parallel jobs. Physical resources allocated to a virtual container change with system load and use, dynamically changing the resources consumed by presently executing jobs. This may cause the jobs to fail to meet completion time objectives.

In addition, unevenness in the execution rate of parallel tasks for a job also affect the utilization of the overall system. Some containers may have idle tasks while waiting for other tasks to catch up. Further, parallel jobs need a stable set of compute resources for long periods of time (up to months). Inappropriate scheduling assignments will have long lasting effects, unlike transactional workloads with typical execution times of sub-seconds.

A need therefore exists for improved methods and apparatus for scheduling parallel jobs in a system of virtual containers. A further need exists for techniques for scheduling a parallel job in a system of virtual containers with a controlled impact on already existing jobs.

SUMMARY OF THE INVENTION

Generally, methods and apparatus are provided for scheduling parallel jobs in a system of virtual containers. According to one aspect of the invention, at least one parallel job is assigned to a plurality of containers competing for a total capacity of a larger container, wherein the at least one parallel job comprises a plurality of tasks. The assignment method comprises determining a current utilization and a potential free capacity for each of the plurality of competing containers; and assigning the tasks to one of the plurality of containers based on the potential free capacities and at least one predefined scheduling policy.

The potential free capacity is based, for example, on one or more of a total capacity, a comparison of one or more of the current utilizations to one or more corresponding equilibrium capacities and a relative resource weight of each of the plurality of competing containers, wherein the equilibrium capacity for each of the plurality of competing containers indicates a capacity that the corresponding container is entitled to.

The predefined scheduling policy may comprise, for example, one or more of load balancing, server consolidation, maximizing the current utilizations, minimizing a response time of the parallel job and satisfying quality of service requirements. The load balancing can be achieved, for example, by assigning a task to a container having a highest potential free capacity.

The assignment can evaluate, for example, an impact of a new parallel job on existing one or more existing jobs, as well as concurrent execution requirements of the tasks.

A more complete understanding of the present invention, as well as further features and advantages of the present invention, will be obtained by reference to the following detailed description and drawings.

BRIEF DESCRIPTION OF THE DRAWINGS

FIG. 8 is a flow chart describing an exemplary job scheduling process incorporating features of the present invention; and FIG. 9 depicts a computer system that may be useful in implementing one or more aspects and/or elements of the present invention.

DETAILED DESCRIPTION OF PREFERRED EMBODIMENTS

The present invention provides methods and apparatus for scheduling a parallel job in a system of virtual containers, where there is elasticity and competition among containers. According to one aspect of the invention, the disclosed techniques take into account the elasticity and competition of virtual compute containers. According to another aspect of the invention, the disclosed techniques take into account the impact of the elasticity and competition on the workloads of serial and parallel jobs. Generally, a parallel job is comprised of a plurality of tasks assigned to a plurality of containers for concurrent execution.

Figure 1:
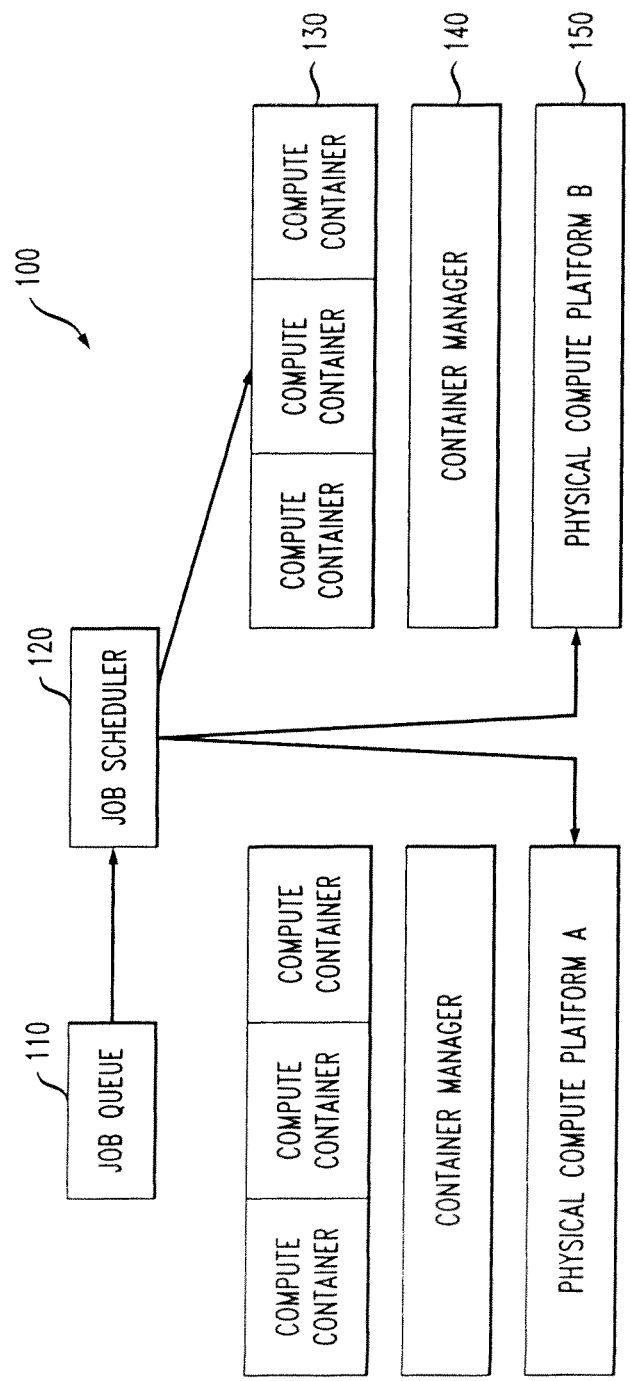
FIG. 1 provides an overview of a conventional exemplary job scheduler.

FIG. 1 provides an overview of a conventional exemplary job scheduler 100. As shown in FIG. 1, one or more jobs stored in a job queue 110 are processed by a job scheduler 120 to assign each given job to one or more available physical resources, such as physical compute platforms 150. The physical resources 150 may comprise, for example, processing cores, storage systems, and network communication resources. As previously indicated, the scheduler 120 assigns jobs by matching job requirements with the capabilities and capacity of the resources 150. For a more detailed discussion of techniques for scheduling one or more jobs to a system of virtual containers, see U.S. patent application Ser. No. 12/751,089, filed Mar. 31, 2010, entitled "Methods and Apparatus for Resource Capacity Evaluation in a System of Virtual Containers," incorporated by reference herein.

As shown in FIG. 1, the physical resources 150 are exposed through one or more resource containers 130, each providing an abstraction of the underlying resources 150. The exemplary containers 130 typically share these underlying physical resources 150 under supervision of a container manager 140. The containers 130 often compete with one another for the underlying resources 150.

Figure 2:
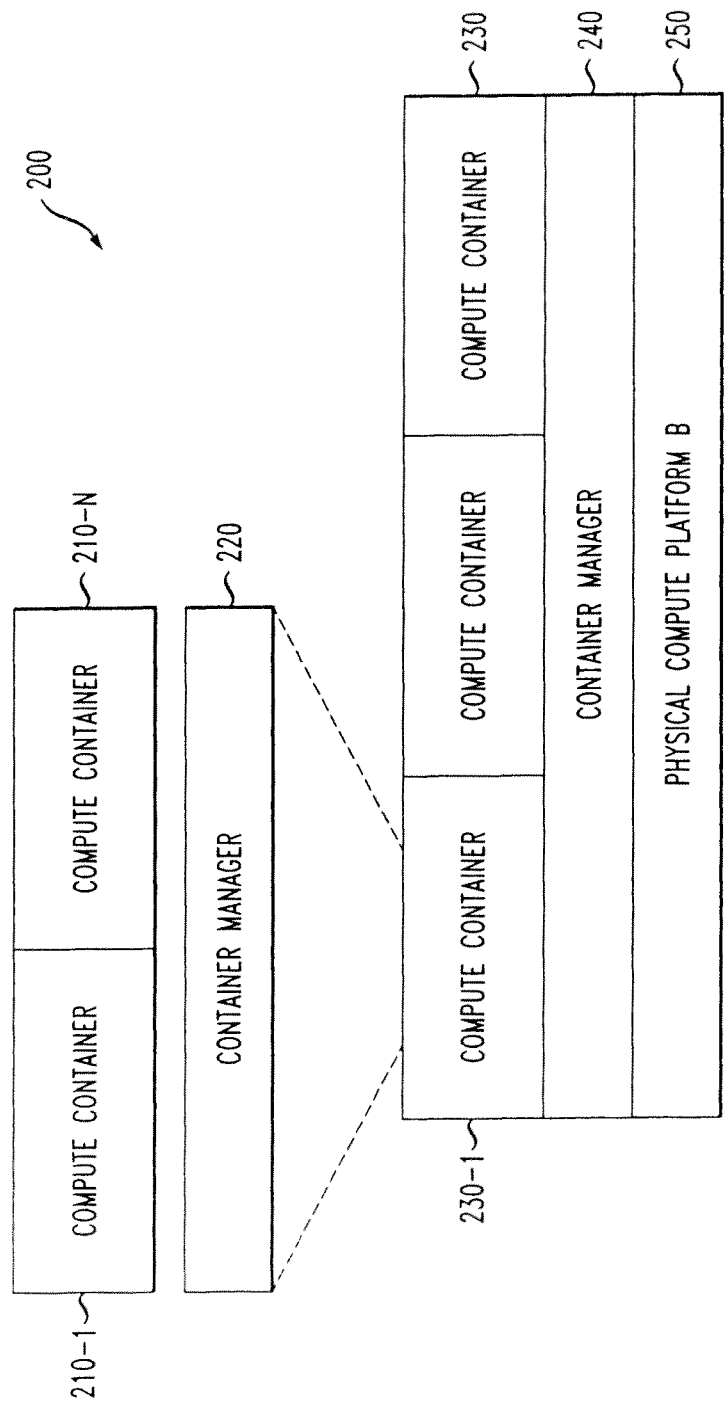
FIG. 2 provides an overview of an alternative conventional exemplary job scheduler.

The job scheduler 100 of FIG. 1 employs a single layer of containers 130. FIG. 2 provides an overview of an alternative conventional exemplary job scheduler 200. As shown in FIG. 2, a particular container, such as container 230-1, can host one or more additional containers 210-1 through 210-N and one or more container managers 220.

In a multi-container environment, the various containers 130, 230 share and compete for fixed platform resources 150, 250. The evaluation of the resource capacity of the containers 130, 230 is important in the scheduling process performed by the scheduler 120.

Figure 3:
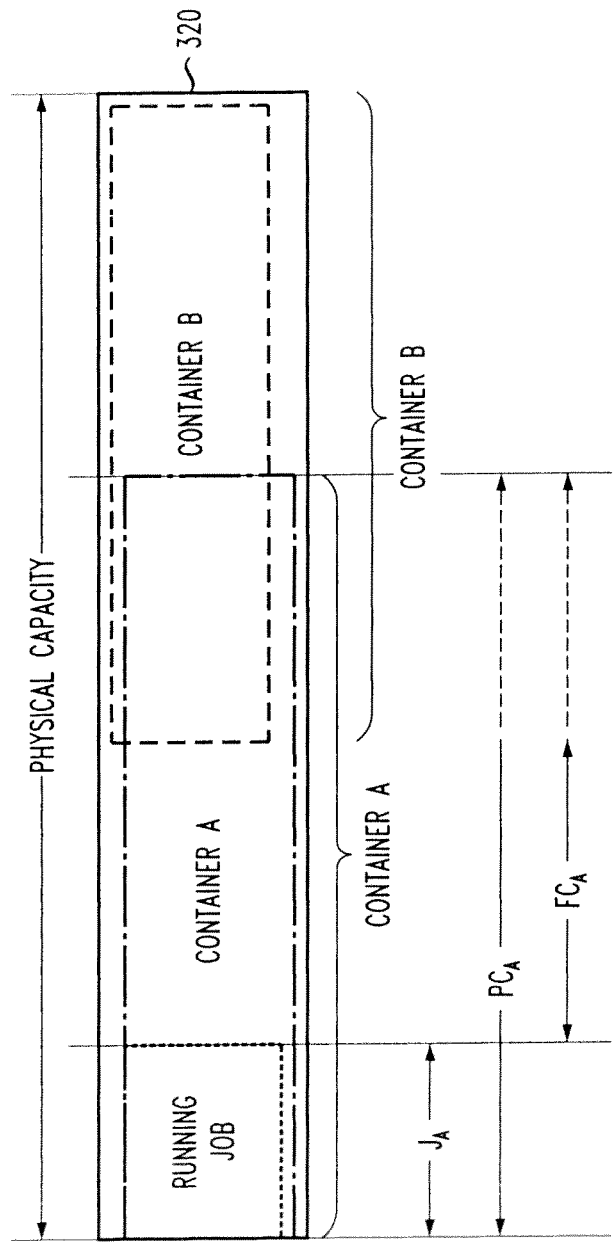
FIG. 3 illustrates various types of container capacity for two exemplary containers.

Potential resource capacity is evaluated for systems having a plurality of containers 130, 230. FIG. 3 illustrates various types of container capacity for two exemplary containers A, B. As shown in FIG. 3, a parent container 320 (or platform) having a fixed-size provides a total physical capacity. The total physical capacity is dynamically allocated to containers A and B. There is an exemplary job running on container A. The exemplary job running on container A has a utilization, $J_A$.

The two exemplary containers A, B each have a potential capacity (PC). Container A, for example, has a potential capacity, $PC_A$. As used herein, the potential capacity corresponds to an amount that each container could presently utilize (e.g., a maximum available capacity). The potential capacity depends on the state of the system and how the manager apportions resources during contention. As shown in FIG. 3, the job running on container A consumes an amount of resource, J.

The two exemplary containers A, B have a free capacity (FC) (also referred to as a potential free capacity (PFC)). Container A, for example, has a free capacity, $FC_A$. As used herein, the free capacity is the remaining resource in each container up to the potential capacity (e.g., the capacity that is available for new work). Thus, the potential capacity of a container can be expressed as follows:

$$PC = J + FC.$$

The free capacity can thus be calculated from the potential capacity and utilization. It is noted that depending on the system state, the sum of the potential capacity of all containers can exceed the physical capacity of the underlying platform. Generally, the potential capacity of each container A, B is computed from physical capacity, container attributes, state, and utilization across all containers.

The free capacity of each container is often a key parameter in job scheduling algorithms. For example, a representative conventional scheduling method assigns each job to the platform with the greatest free capacity. In this manner, the scheduling provides basic load balancing, distributing jobs among available machines. In the traditional case of scheduling on physical resources, the free capacity of the platform is directly available from utilization monitors. For scheduling on competing containers, however, the free capacity cannot be obtained from the current system state (e.g., utilization of resources in all containers) because the free capacity depends on the rules and policies implemented by the container manager 140, 240.

Calculating Potential Capacity for Virtual Containers

As previously indicated, potential capacity can be evaluated for a system having a plurality of containers 130, 230. The potential resource capacity for each container 130, 230 is evaluated, given the current system state and using the rules by which the container manager 140 arbitrates demand among containers 130, 230. This potential capacity is then applied in the job assignment algorithm to choose a container for each job or job element to run.

Estimated Resource Consumption

As each job is allocated to a container 130, 230, the system state changes, which must be taken into account when scheduling the next job. This can be a problem, for example, when a group of jobs is scheduled at once and there is insufficient time to assess the effect of each job placement prior to assigning the next job.

The amount of a given resource that each job consumes during execution may be known, on average. Thus, after a job is allocated to a container, the free usage of the container can be adjusted using the average resource consumption. In one exemplary embodiment, when the average resource consumption is not available, an estimate can be made, for example, based on an average of the recent resource consumption of jobs of that type.

Resource consumption by a job is often variable. Thus, in a further variation, the potential capacity and free capacity are assigned according to the statistical usage of the job and competing jobs on the system. For example, assume the free capacity is at or below a value of 0.8, for 90% of the time.

In yet another variation, when the average resource consumption is not available, a default amount can be employed, for example, based on the equilibrium point capacity.

According to another aspect of the invention, the potential resource capacity for each container 130, 230 is evaluated based on a particular container model of arbitrating resource contention. As used herein, the term "equilibrium resource" indicates the resource each container is allocated in the limit of full contention from all containers. The equilibrium point is an important aspect under full contention. In addition, the equilibrium point can be employed to compute the free capacity based on a set of container attributes that define how the resource is fairly distributed among the containers in situations of full or partial contention.

Resource Allocation with Contending Containers

Figure 4:
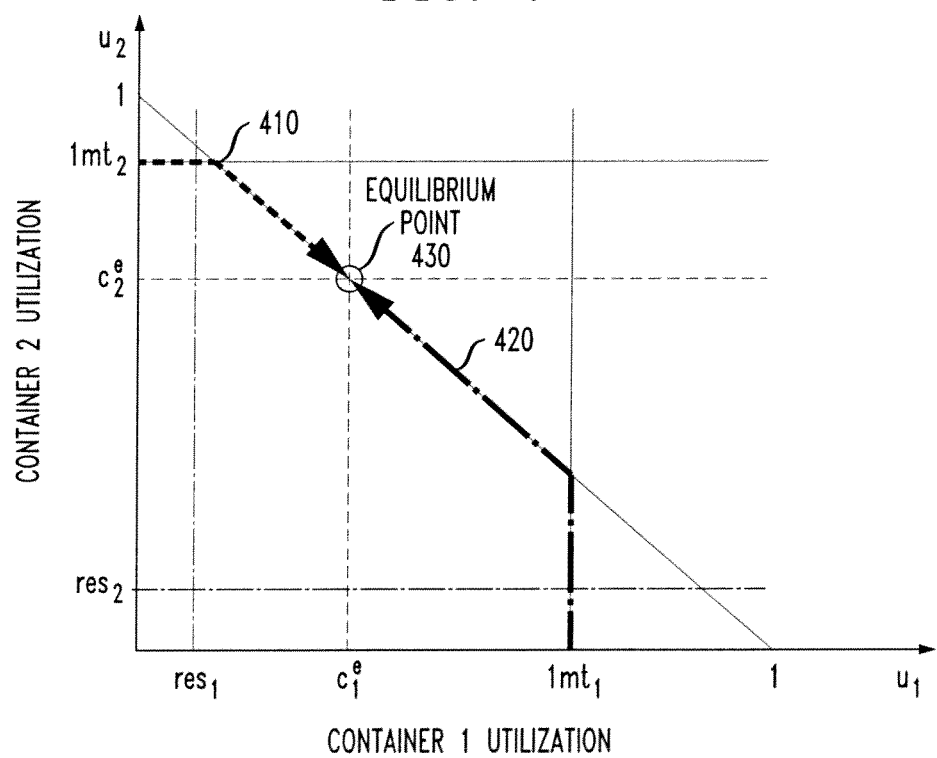
FIG. 4 illustrates the allocation of resources for two exemplary containers in contention.

FIG. 4 illustrates the allocation of resources for two exemplary containers 1, 2 in contention. The utilization, $u_1$, $u_2$, is shown in FIG. 4 on each axis for the respective containers 1, 2, competing for a total capacity of unity (e.g., $u_1+u_2=1$). A first line 410 indicates the potential capacity for utilization $u_2$ as utilization $u_1$ increases along the horizontal axis. Likewise, a second line 420 indicates the corresponding potential capacity for utilization u2. Each container 1, 2 has a corresponding maximum utilization, 1 mt. In addition, as shown in FIG. 4, each container 1, 2 has a corresponding reserved utilization, res. Further, as shown in FIG. 4, each container 1, 2 has a corresponding potential capacity, $c_i$. In addition, each container 1, 2 can optionally have an assigned weight or relative share, which may optionally be employed when computing the equilibrium capacity.

The intersection of the two potential capacities, $c_1$ ($c_1=c_2$), is the equilibrium point 430, where the system state converges under full contention. In other words, the equilibrium point 430 is where both containers 1, 2 attempt to use more than their respective equilibrium point 430 of resource. The equilibrium point 430 is useful for partitioning states of the system according to whether utilization of each container is above or below its equilibrium point.

Scheduling Parallel Jobs

Aspects of the present invention schedule one or more parallel jobs in a system of virtual containers, based on one or more scheduling policies and objectives. For example, various implementations of the present invention schedule jobs based on one or more policies, such as load balancing and server consolidation (e.g., powering off machines). In addition, various implementations of the present invention schedule jobs based on one or more objectives, such as maximizing utilization of the compute resources, minimizing job response time and meeting quality of service requirements.

To schedule one or more additional jobs from a job queue, the disclosed scheduler considers that the act of placing and executing each new job changes the system state and affects currently running jobs. This interaction occurs when execution of a new job task on a virtual container influences the resources available to the currently running jobs in other containers on the same machine. A primary cause is that virtual machine containers are elastic and share resource according to their rules. As discussed hereinafter, interactions between executing tasks and new tasks that extend across containers on different physical machines are included as an aspect of the present invention. These later interactions are a result of the coordination and synchronization of the operation between component tasks of parallel program jobs.

Figure 5:
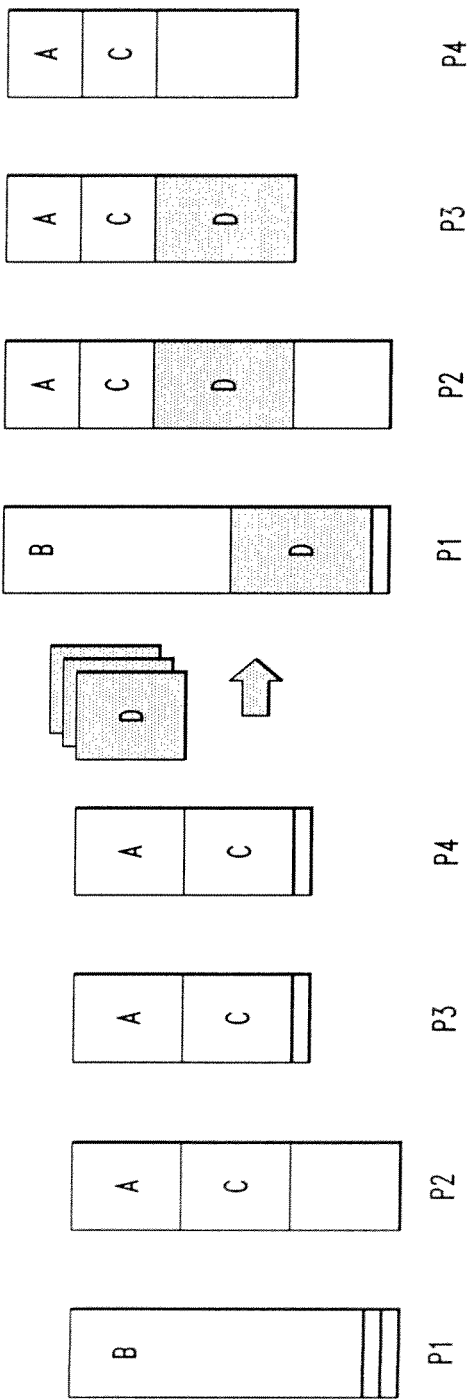
FIG. 5 illustrates the scheduling of one or more parallel jobs in a system of virtual containers, based on a load balancing policy.

FIG. 5 illustrates the scheduling of one or more jobs A, B, C, D, including one or more parallel jobs, in a system of virtual containers P1 through P4, based on a load balancing policy. It is noted that each processor hosts a number of virtual containers. As previously indicated, the virtual containers on processors P1 through P4 compete for the shared resources on the same physical container. In addition, the allocation of a new job, such as job D, may cause performance degradation of existing jobs A-C.

As shown in FIG. 5, serial job B is initially executing on container P1 and tasks of parallel jobs A and C are each executing concurrently on containers P2-P4. As discussed hereinafter, the present invention must now schedule parallel job D on one or more of containers P1-P4. It is noted that the tasks of the parallel jobs A, C and D have a correlated resource demand. An aspect of the present invention aims to correlate the utilization across both the virtual and physical containers.

In the exemplary allocation shown in FIG. 5, tasks from parallel job D are allocated to containers P1-P3 to balance the existing load. It is noted that the allocation of resources to the tasks from jobs A and C on container P4 is reduced, even though no task from new job D is assigned to container P4, due to the correlation among the tasks.

An aspect of the present invention recognizes that the expected completion time of running jobs A-C increases as jobs A-C lose resources to a newly scheduled job D. The increased running time from what the jobs A-C would experience if they did not lose resources to the newly scheduled job D is referred to as the expansion factor. For example, the disclosed job scheduler may consider that placing new job D on a machine that is already executing job B, the newly assigned job D will compete with the existing job B and may slow the completion time of existing job B. It is noted that the allocation of resources to the tasks from jobs A and C on container P4 is reduced, even though no task from new job D is assigned to container P4, due to the correlation among the tasks. On the other hand, the new job D may be assigned to a machine that has fewer jobs and the most available capacity to share.

Figure 6:
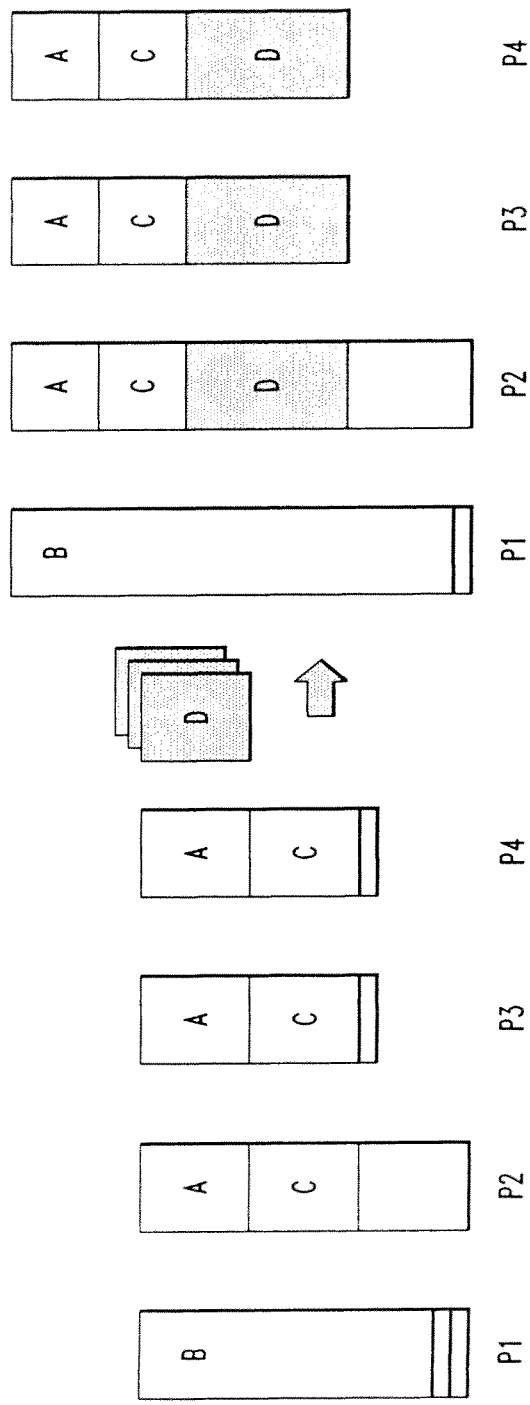
FIG. 6 illustrates the scheduling of one or more parallel jobs in a system of virtual containers, based on a server consolidation policy.

FIG. 6 illustrates the scheduling of one or more jobs A, B, C, D, including one or more parallel jobs, in a system of virtual containers P1 through P4, based on a server consolidation policy. As shown in FIG. 6, serial job B is initially executing on container P1 and tasks of parallel jobs A and C are each executing concurrently on containers P2-P4. As discussed hereinafter, the present invention must now schedule parallel job D on one or more of containers P1-P4.

In the exemplary allocation shown in FIG. 6, tasks from parallel job D are allocated to containers P2-P4 to consolidate the parallel jobs on containers P2-P4. In this manner, when serial job B completes on container P1, container P1 can be powered down.

Placing a new job task on a machine may affect other machines through a coupling mechanism caused by the existence of parallel job tasks on that machine and other machines. In the typical model of parallel job execution, concurrent tasks of the job periodically pause and synchronize their state with peer tasks. Thus, the tasks use computing resource in lockstep, so that no task can progress faster that the slowest in the system in each synchronization interval. A ripple effect on other machines is introduced when a task is slowed (or speeded up) by resource competition on each machine. When multiple parallel jobs are in the system this interaction is complex and feedback cycles may occur between the parallel jobs.

Another aspect of the invention assigns parallel jobs to achieve core encapsulation. Thus, the job scheduling takes into account the relationship between the job parallelism and the physical cores and the mapping of virtual cores to the underlying physical cores. This aspect of the invention may be employed, for example, when the characteristics of a given task dictate that the task be assigned to a single processor.

The container management policy for sharing resources described above assumes uniform mapping of containers to resources. However, containers can be mapped in arbitrary ways to discreet resources such as processor cores. In fact, there are reasons to restrict containers to subsets of the cores. Thus, the scheduler can optionally account for the mapping of containers to cores when assigning jobs.

As another aspect of the invention, the scheduler can optionally consider the ability of the job to effectively use the mapping of a container to resources in scheduling the job. For example, if job tasks cannot leverage multiple compute cores by running multiple threads it will underutilize a container mapped to multiple cores.

Containers may themselves map underlying physical cores to virtual cores and this mapping can also be taken into account by the job scheduler. For example, if the number of virtual processor cores exceeds the number of physical cores, completely concurrent execution is not possible. The resulting time-sharing affects performance.

Figure 7:
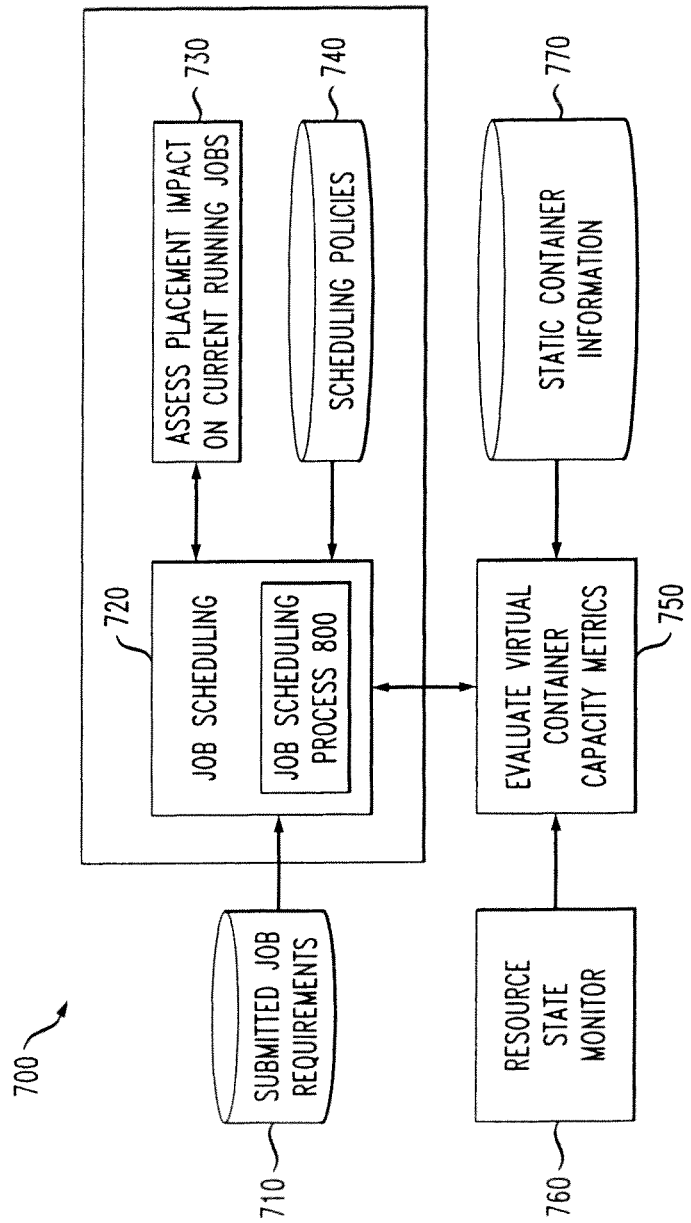
FIG. 7 is a schematic block diagram of an apparatus that schedules parallel jobs in accordance with the present invention.

FIG. 7 is a schematic block diagram of an apparatus 700 that schedules parallel jobs in accordance with the present invention. As shown in FIG. 7, a job scheduler 720 obtains the job requirements 710, such as nodes, run time and cycles, for a new job in a queue. The job scheduler 720 employs a set of monitoring and analysis components that enable the assignment of jobs to virtual containers while meeting target objectives. An exemplary job scheduling process 800, implemented by the job scheduler 720, is discussed further below in conjunction with FIG. 8.

As shown in FIG. 7, the job scheduler 720 employs an evaluation block 750 to evaluate the capacity metrics of the virtual containers. The evaluation block 750 queries a data store 770 that stores static container information, such as attributes, policies, and mapping to cores of the containers, for the rules on how the virtual machines share the resources of the underlying physical machines.

In addition, the evaluation block 750 queries the current system state from a resource state monitor 760, such as the utilization of each virtual machine. Using this information, the free capacity of each virtual machine can be computed. In the exemplary embodiment, the virtual machines are sorted according to the free capacity metric. The scheduler 720 now commences consideration of how to allocate the parallel job to the virtual containers, using an assessment 730 of the placement impact on current running jobs and the scheduling policies 740. As previously indicated, various implementations of the present invention schedule jobs based on one or more policies and objectives, such as load balancing, server consolidation (e.g., powering off machines), maximizing utilization of the compute resources, minimizing job response time and meeting quality of service requirements.

FIG. 8 is a flow chart describing an exemplary job scheduling process 800 incorporating features of the present invention. Generally, the exemplary job scheduling process 800 allocates one parallel job to a given set of physical and virtual containers by finding a set of virtual containers upon which the new job and existing jobs can have the best performance.

As shown in FIG. 8, the exemplary job scheduling process 800 initially initializes a counter, $c_k$, of the currently allocated tasks on physical machine, k, to zero during step 810. $r_{kj}$ is the free capacity of virtual machine, j, on physical machine, k. In addition, $a_k$=max $\{r_{kj}\}$ is the maximum free capacity of the available virtual machines on on physical machine, k.

A loop is started during step 820 for task i. The virtual machines are sorted during step 830 in descending order based on the free capacity. During step 840, the exemplary job scheduling process 800 allocates a task i to virtual machine j on physical machine k with the maximal free capacity $a_k$. The counter $c_k$ is incremented and the free capacity $a_k$ is updated during step 840 to be the maximum free capacity, excluding the allocated virtual machine. Thus, the free capacity is recomputed after each assignment. The exemplary job scheduling process 800 is a greedy algorithm, since it assigns a job to the virtual machine having the highest free capacity first.

Generally, the exemplary job scheduling process 800 sequentially assigns tasks of parallel jobs to virtual machines ranked by the potential free capacity.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. FIG. 9 depicts a computer system 900 that may be useful in implementing one or more aspects and/or elements of the present invention. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Analog-to-digital converter(s) 920 may be provided to receive analog input, such as analog video feed, and to digitize same. Such converter(s) may be interconnected with system bus 910.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 918 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGURES illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 902. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for assigning at least one parallel job to a plurality of virtual containers competing for a total capacity of resources for executing one or more tasks of a larger container comprising the plurality of competing virtual containers, wherein the at least one parallel job comprises a plurality of tasks, the method comprising:
    determining (i) a current utilization of resources for executing the one or more tasks and (ii) a potential free capacity of resources for executing the one or more tasks for each of the plurality of competing virtual containers, wherein:
        the potential free capacity of resources for executing the one or more tasks is based on total capacity of resources of the larger container for executing the one or more tasks and a comparison of the current utilization of resources for executing the one or more tasks to a corresponding equilibrium capacity of resources for executing the one or more tasks, wherein said equilibrium capacity comprises:
        a computed container-specific capacity of resources for executing the one or more tasks to which the corresponding competing virtual container is entitled within a limit of full contention for resources from all of the plurality of competing virtual containers, wherein said computed container-specific capacity of resources is based on a relative resource weight assigned to each of the plurality of competing virtual containers;
    assigning a first task of the plurality of tasks of the at least one parallel job to one of the plurality of competing virtual containers based on (i) a ranking of the potential free capacities, (ii) a relationship between (a) the parallelism of the at least one parallel job and one or more underlying physical cores and (b), the mapping of the plurality of competing virtual containers to the one or more underlying physical cores, and (iii) at least one predefined scheduling policy; and
    re-determining the potential free capacity of resources for executing, in parallel, one or more tasks of the plurality of tasks of the at least one parallel job for each of the plurality of competing virtual containers, excluding the virtual container to which the first task was assigned, subsequent to said assigning the first task, and repeating said step of assigning for the one or more tasks of the plurality of tasks of the at least one parallel job.

2. The method of claim 1, wherein the assigning step further comprises the step of evaluating resource demands of the tasks.

3. The method of claim 1, wherein the at least one predefined scheduling policy comprises one or more of load balancing, server consolidation, maximizing the current utilizations, minimizing a response time of the parallel job and satisfying quality of service requirements.

4. The method of claim 3, wherein the assigning step performs the load balancing by assigning a task to a container having a highest potential free capacity.

5. The method of claim 4, wherein the assigning step assigns a task to one of two containers having a substantially equal potential free capacity based on an equilibrium capacity.

6. The method of claim 1, wherein the assigning step evaluates an impact of a new parallel job on existing one or more existing jobs.

7. The method of claim 1, further comprising the step of evaluating concurrent execution requirements of the tasks.

8. The method of claim 1, wherein the determining step further comprises the step of obtaining one or more of a minimum and maximum capacity for each of the plurality of containers.

9. The method of claim 1, further comprising the step of recalculating the potential free capacity when the set of plurality of containers is changed.

10. The method of claim 1, further comprising the step of recalculating the potential free capacity after the assignment of each work element.

* * * * *